(12) United States Patent
Bourdon et al.

(10) Patent No.: US 9,237,276 B2
(45) Date of Patent: Jan. 12, 2016

(54) METHOD AND DEVICE TO CAPTURE IMAGES BY EMULATING A MECHANICAL SHUTTER

(75) Inventors: Pascal Bourdon, Chevaigne (FR);
Jonathan Kervec, Paimpont (FR);
Didier Doyen, La Bouexiere (FR)

(73) Assignee: Thomson Licensing (FR)

( * ) Notice: Subject to any disclaimer, the term of this patent is extended or adjusted under 35 U.S.C. 154(b) by 697 days.

(21) Appl. No.: 12/998,982

(22) PCT Filed: Dec. 21, 2009

(86) PCT No.: PCT/EP2009/067651
§ 371 (c)(1),
(2), (4) Date: Jun. 21, 2011

(87) PCT Pub. No.: WO2010/072718
PCT Pub. Date: Jul. 1, 2010

(65) Prior Publication Data
US 2011/0254998 A1    Oct. 20, 2011

(30) Foreign Application Priority Data
Dec. 22, 2008   (EP) .................................... 08305992

(51) Int. Cl.
*H04N 5/243* (2006.01)
*H04N 5/355* (2011.01)
*H04N 5/357* (2011.01)

(52) U.S. Cl.
CPC ............. *H04N 5/243* (2013.01); *H04N 5/357* (2013.01); *H04N 5/35536* (2013.01)

(58) Field of Classification Search
CPC ........ G06T 5/50; H04N 5/235; H04N 5/2352; H04N 5/2355; H04N 5/2356; H04N 5/2357; H04N 5/35536; H04N 5/243; H04N 5/357
See application file for complete search history.

(56) References Cited

U.S. PATENT DOCUMENTS

| 4,774,588 A | 9/1988 | Noda et al. |
| 5,198,902 A | 3/1993 | Richards et al. |
| 5,585,848 A * | 12/1996 | Hieda et al. .................. 348/297 |

(Continued)

FOREIGN PATENT DOCUMENTS

| EP | 0479213 | 4/1992 |
| EP | 0506031 | 9/1992 |

(Continued)

OTHER PUBLICATIONS

Dachille et al., "High-Degree Temporal Antialiasing", Computer Animation 2000, May 3, 2000, pp. 49-54.

(Continued)

*Primary Examiner* — Jason Flohre
(74) *Attorney, Agent, or Firm* — Jack Schwartz & Associates, PLLC

(57) ABSTRACT

To capture an image, the image sensing period of this image is subdivided into a plurality of successive illumination periods, and the value which is assigned to each pixel to capture the image is the sum of the integrals of intensity of illumination of this pixel over each of said successive illumination periods. According to the invention, this sum is weighted by an apodization function in order to emulate a mechanical shutter. Temporal aliasing issues and temporal ringing artifacts of digital imaging are prevented or at least limited.

7 Claims, 4 Drawing Sheets

(56) References Cited

U.S. PATENT DOCUMENTS

| | | | |
|---|---|---|---|
| 6,778,210 B1* | 8/2004 | Sugahara et al. | 348/208.4 |
| 7,498,555 B2 | 3/2009 | Koh et al. | |
| 2003/0030744 A1* | 2/2003 | Baer | 348/370 |
| 2004/0016919 A1 | 1/2004 | Daiku et al. | |
| 2004/0109069 A1 | 6/2004 | Kaplinsky et al. | |
| 2006/0012830 A1* | 1/2006 | Aiso | 358/3.27 |
| 2006/0158399 A1 | 7/2006 | Kimura et al. | |
| 2006/0187328 A1 | 8/2006 | Lim | |
| 2007/0139792 A1 | 6/2007 | Sayag | |
| 2008/0063294 A1* | 3/2008 | Burt et al. | 382/255 |
| 2008/0143840 A1* | 6/2008 | Corkum et al. | 348/208.6 |

FOREIGN PATENT DOCUMENTS

| | | |
|---|---|---|
| EP | 0912047 | 4/1999 |
| EP | 1067778 | 1/2001 |
| EP | 1176807 | 1/2002 |
| EP | 1764736 | 3/2007 |
| EP | 1814073 | 8/2007 |
| EP | 1924085 | 5/2008 |
| IL | 88484 | 6/1993 |
| JP | 2252371 | 10/1990 |
| JP | 888794 | 4/1996 |
| KR | 100660869 | 12/2006 |
| RU | 1779931 | 12/1992 |
| WO | W09908388 | 2/1999 |
| WO | WO-9962249 | 12/1999 |
| WO | WO-0135657 | 5/2001 |
| WO | WO-2005059832 | 6/2005 |
| WO | WO-2006088722 | 8/2006 |
| WO | WO-2006094871 | 9/2006 |
| WO | WO-2008004230 | 1/2008 |

OTHER PUBLICATIONS

Wikipedia: "Multiple Exposure", Internet Citation, [Online], Sep. 29, 2008.

PCT Search Report Dated Mar. 17, 2010 and EPO Search Report Dated Feb. 20, 2009.

Weijer et al., "Learning Color Names for Real World Application", IEEE Transactions on Image Processing, vol. 18, No. 7, 2009, pp. 1512-1523.

* cited by examiner

METHOD AND DEVICE TO CAPTURE IMAGES BY EMULATING A MECHANICAL SHUTTER

This application claims the benefit, under 35 U.S.C. §365 of International Application PCT/EP2009/067651, filed on Dec. 21, 2009, which was published in accordance with PCT Article 21(2) on Jul. 1, 2010 in English and which claims the benefit of European patent application No. 08305992.3, filed on Dec. 22, 2008.

This invention applies to image capture devices, especially camcorder devices. A well-known issue in video capture is the apparition of visible flicker effects, for instance when filming with fluorescent lights or aiming at computer screens. When using a video capture device with a shutter, shutter synchronization can usually remove such artifacts. When using digital camcorders that generally do not comprise mechanical shutter, the abrupt temporal truncation of incoming photons in their light sensors made by electronic shutters may cause artifacts. This behavior is also responsible for increased motion blur artifacts.

As technology improves, electronic control of video camera shutters has been widely developed. Shutter control allows for instance to control the amount of motion that is recorded in a picture or in a video frame, by limiting exposure time prior to acquisition. Exposure time is determined by limiting the sampling time of the electronic sensor of the camera. As such control is completely electronic with no mechanical movement, this control can be very precise and reliable. However, from a digital signal processing theory point of view, because of their ultra-fast, "binary" (fully opened/fully closed) behavior, electronic shutters can present nonlinearity-related time-instability issues: the abrupt truncation of sensor illumination in time domain happens to generate a temporal ringing artifact known in signal processing theory as the "Gibbs" phenomenon.

In space domain, the effects of such abrupt truncations are well known, as, for instance, the geometrical limits of a lens or of an optical filter. Such effect are well known spatial artifacts as, for instance, sidelobes of diffraction pattern. Such artifacts can be avoided, for instance, by using so-called "apodized" optical filters. Apodization literally means "removing the foot". It is the technical term for changing the shape of a mathematical function. It is also called tapering. In optical design jargon, an apodization function is used to purposely change the input intensity profile of an optical system. This technique is classically used in optics to remove the sidelobes of a diffraction pattern.

The sharpness of an image capture device or of a component of an optical system (lens, film, image sensor, scanner, enlarging lens, etc.) is characterized by a parameter called Modulation Transfer Function (MTF), also known as spatial frequency response. It is well known to add apodized filters to get apodized lens aperture (or apodized stop), in order to improve the MTF of lenses: according to US2007/139792, "a perfectly apodized aperture is an aperture for which light transmission T varies along its radius x as a Gaussian curve".

For the capture of still pictures, it is known to use a long exposure. Long exposures are not adapted for video sequences. It is also known to distribute such long exposure over a plurality of successive smaller exposures, the integration of the plurality of exposures giving the long exposure. This integration or averaging also permits to be a time-windowing function, such as a Gaussian, that weights the different exposures near the center of the long exposure time more strongly. See for instance http://en.wikipedia.orq/wiki/Multiple exposure.

In time domain, specifically for the capture of video sequences, i.e. for the capture of successive images of a scene notably with moving objects, at least two types of temporal ringing artifacts may occur:
 flickering effect between the successive frames or images, when, for instance, the scene should be captured under fluorescent lighting conditions, notably when the shuttering frequency of the video capture device, for instance 60 Hz, interferes with the frequency of AC power supply for the lighting, for instance 50 Hz in Europe (in such a situation, capture of still images is only a problem of setting the light gain).
 similarly, as any movement of objects in such a scene has its own spectrum of temporal frequencies; interferences of some of these frequencies with the shutter frequency of the video capture device will create artifacts similar to the Gibbs phenomenon quoted above.

An object of the invention is to avoid or at least limit these temporal ringing artifacts that are generally generated when using digital video image capture devices, notably for the capture of a scene with moving objects.

For this purpose, the subject of the invention is a device for video capturing successive images of a scene comprising moving objects, said device comprising at least one image sensing device having an active surface made of an array of pixels and able to sense each of these pixels by providing a readout signal representative of the combination of intensity and duration of illumination of said pixel, an optical system able to form successively said images of said scene on said active surfacesuch as to illuminate said active surface, and driving means able to drive said image sensing device and to assign a value to each pixel of each formed successive image for said video capture, wherein, an image sensing period of illumination of said active surface being predetermined for said video capture, said driving means are adapted:
 to subdivide said image sensing period into a plurality of successive illumination periods,
 for each of said images, to assign to each pixel the sum of the readout signals provided by this pixel for each of said successive illumination periods, said sum being weighted by an apodization function.

The image sensing period corresponds to the exposure time of each image of the scene to capture. Preferably, said image sensing period is inferior to 60 ms, which is a common requirement for the capture of video sequences.

The image sensing device may be for instance a CCD imager or a CMOS imager. Generally, each pixel of the imager is a light sensor.

The readout signals provided by the image sensing device may an electric voltage or a digital signal. Electric voltages are generally converted into digital values before being summed and weighted.

The optical system generally comprises an objective lens and may comprise prisms, notably when the video image capture device comprises a plurality of image sensing device, generally one for each primary color, red, green and blue.

Thank to the invention, temporal aliasing issues and temporal ringing artifacts are prevented or at least limited for the capture of video sequences.

In this invention, a new image sensor device matrix readout scheme with time-sequenced gain control is then proposed, thus providing a better truncation (or "apodization") operation of the electronic shutter. Such a readout scheme that is implemented by the driving means of the video image capture device of the invention allows advantageously to simulate or emulate a mechanical shutter. As a matter of fact, as illustrated on FIG. 1, video image capture devices having mechanical shutter have inherently an apodized shutter, because the shutter starts and stops (or opens and closes) progressively the flux of light. FIG. 2 illustrates the corresponding time frequency response of the diagram of FIG. 1.

Digital video image capture devices have "electronic shutter", corresponding generally to the frame integration period of the CCD imager used as image sensing device. Such an electronic shutter opens and closes abruptly the flux of light, as illustrated by the rectangle function shown on FIG. 3 and algebraically expressed as follows:

$$rect_T(t) = \begin{cases} 1 & \text{if } t \in \left[\frac{-T}{2}, \frac{T}{2}\right] \\ 0 & \text{else.} \end{cases}$$

FIG. 4 illustrates the corresponding time frequency response of the diagram of FIG. 3, which is algebraically a cardinal sine function $\sin c(\pi f T)$. This figure shows sidelobes effects with far higher magnitude compared to FIG. 2. Such sidelobes effects with high magnitude may be very annoying, notably when they fall within the frequency sensibility range of human eye (i.e. below 50 Hz). As it turns out, although electronic shutter operation's prime purpose is to prevent over/under-exposure issues, i.e. too long or too short image sensing period, its time-integrating properties happen to make it behave as a pre-sampling lowpass filter, thus preventing temporal aliasing issues as well. Such a temporal filter's −3 dB cutoff frequency $f_c$ is directly related to the exposure time or image sensing period according to the following equations:

$$\frac{\|\sin c(\pi f_c T)\|^2}{\|\sin c(0)\|^2} = \frac{1}{2}$$

$$\Rightarrow \sin c(\pi f_c T) = \frac{1}{\sqrt{2}}$$

Knowing that the sin c(.) function is polynomial (it has a rapidly convergent power series representation) and that a coarse approximation of the root of the above equations is $f_c = 1/2T$, this equation can be numerically solved using the Newton-Raphson iterative method for finding roots:

$$f_c = \frac{1.3915574}{\pi T}$$

As an example, a shutter speed of T=1/50 (corresponding to a standard configuration in PAL camcorders) generates a low pass filter with cutoff frequency at $f_c$=22.15 Hz, thus preventing aliasing issues, since in this case harmonics over the $$\frac{f_s}{2} = 25 \text{ Hz}$$

threshold are filtered, with an ensured infinite rejection (−∞dB) over 50 Hz (1/T).

By using a apodization function to apodize the response of the video image sensing device during the exposure time or image sensing period of the capture of each image of a video sequence, the low pass filtering effect will still be improved and side lobe effects avoided or at least limited. Several apodization functions may be used to embody the invention. Unlike the rect(•) function (see above), these apodization functions go smoothly to zero at the beginning and the end of an integration of the captured light, thus preventing nonlinearity-related instabilities. FIG. 5 illustrates the Hanning apodization function and the corresponding time frequency illustrated on FIG. 6 shows lower side lobes effects compared to FIG. 4. FIG. 7 illustrates the Blackman apodization function and the corresponding time frequency illustrated on FIG. 8 shows lower side lobes effects compared to FIG. 4. FIG. 9 illustrates the raised cosine apodization function and the corresponding time frequency illustrated on FIG. 10 shows again lower side lobes effects compared to FIG. 4. As can be seen, because of the smooth truncation process "at the feet", such functions can limit sidelobe effects in the frequency domain. As sidelobes decrease, gain in the bandwidth tends to decrease as well, but this gain loss can be generally corrected using an Automatic Gain Control (AGC) that is usually embedded in a camcorder.

Preferably, said readout signal is proportional to the integral of intensity of illumination of a pixel over the duration of illumination of this pixel. Consequently, the combination of intensity and duration of illumination is represented by this integral.

Preferably, said driving means are also adapted to vary the number of successive illumination periods according to said predetermined image sensing period. The readout speed of the image sensing device may be a limitation for this number of successive illumination periods. In this situation, for very short image sensing periods, this number may be as low as four, and for longer image sensing periods, this number may be eight or higher.

Preferably, said apodization function is chosen in the group consisting of the Hanning apodization function, the Blackman apodization function, and the raised cosine apodization function.

The subject of the invention is also a method to capture successive images of a scene comprising moving objects, wherein each image is captured during an image sensing period, comprising the followings steps:
  subdividing said image sensing period into a plurality of successive illumination periods;
  for each of said successive images, assigning to each pixel of said image a value proportional or equal to the sum of the integrals of intensity of illumination of this pixel over each of said successive illumination periods, wherein said sum is weighted by an apodization function.

The invention will be more clearly understood on reading the description which follows, given by way of non-limiting example and with reference to the appended figures in which:
  FIG. 1 illustrates the time behavior of a mechanical shutter and
  FIG. 2 illustrates the corresponding time frequency of this mechanical shutter;
  FIG. 3 illustrates the rectangle function representing the behavior of a usual electronic shutter and
  FIG. 4 illustrates the corresponding time frequency of this function;
  FIG. 5 illustrates an Hanning apodization function used for the main embodiment of the invention and
  FIG. 6 illustrates the corresponding time frequency of this function;
  FIG. 7 illustrates a Blackman apodization function which may be used to implement the invention and
  FIG. 8 illustrates the corresponding time frequency of this function;

Figure 1:
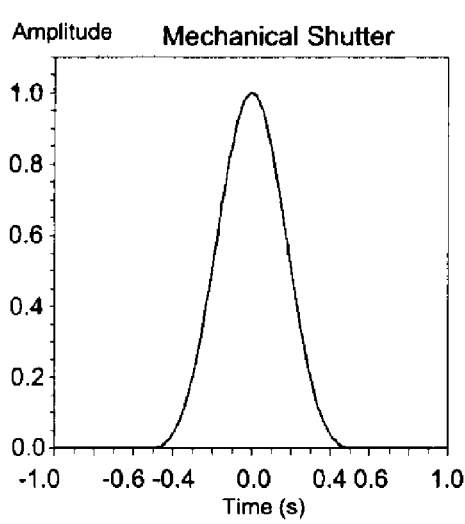
Figure 2:
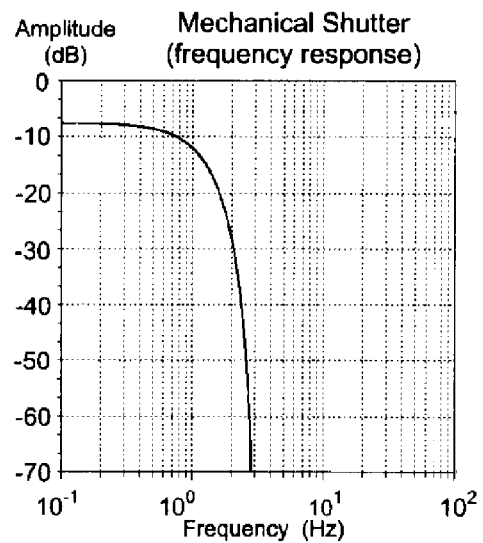
Figure 3:
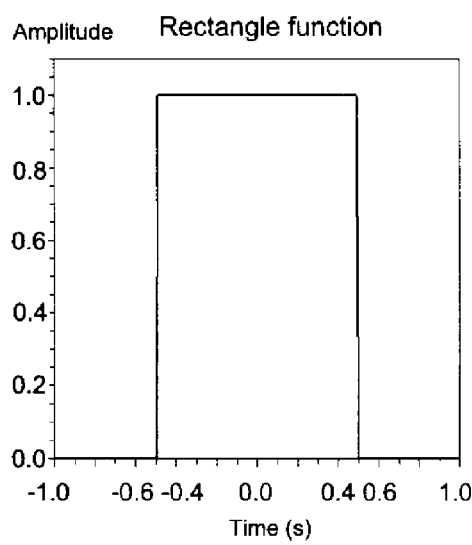
Figure 4:
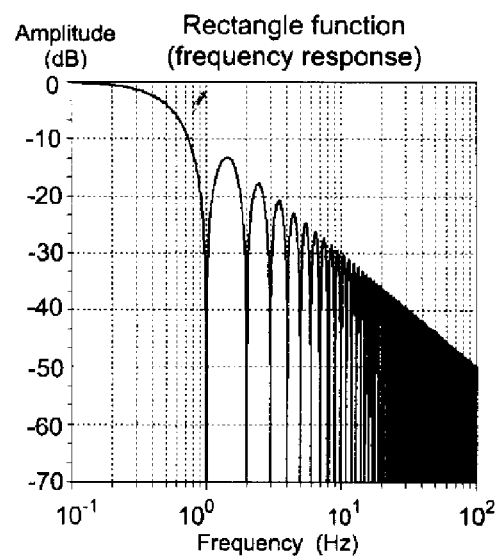
Figure 5:
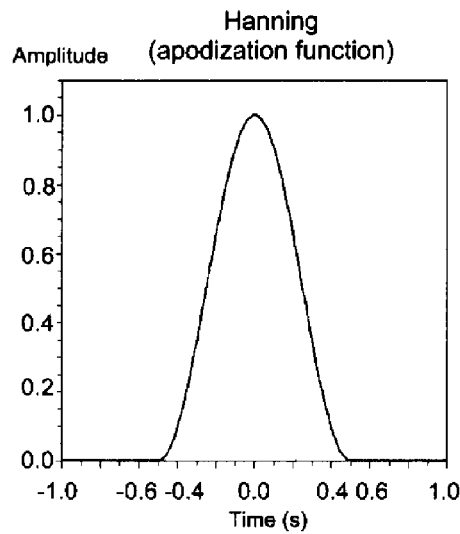
Figure 6:
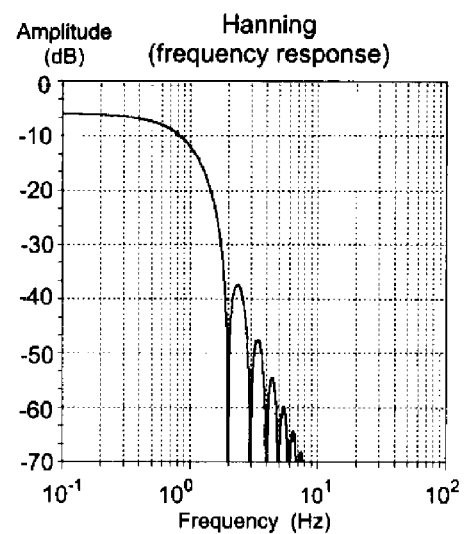
Figure 7:
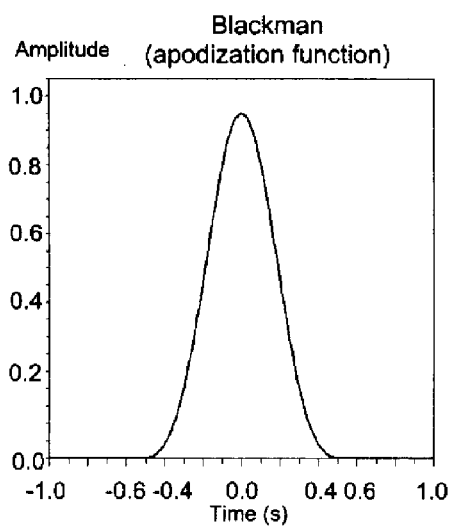
Figure 8:
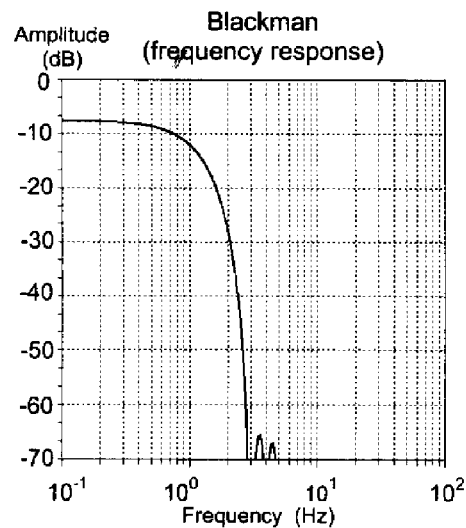
Figure 9:
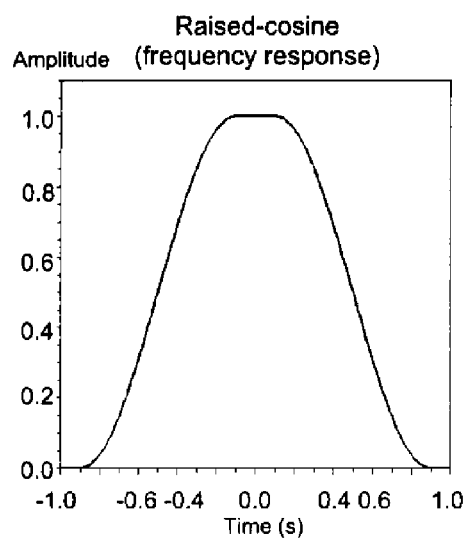
FIG. 9 illustrates a Raised cosine apodization function which may be used to implement the invention and FIG. 10 illustrates the corresponding time frequency of this function.
Figure 10:
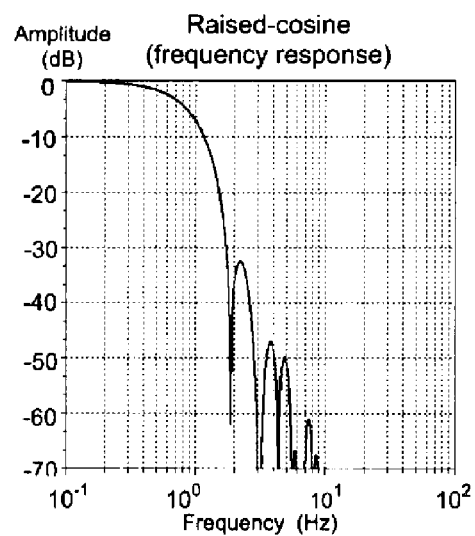

The present description illustrates the principles of the invention. It will thus be appreciated that those skilled in the art will be able to devise various arrangements that, although not explicitly described or shown herein, embody the same present principles and are included within its spirit and scope.

The video image capture device according to a main embodiment of the invention comprises:

- a CCD imager as a image sensing device; this CCD imager has an active surface made of an array of pixels; on operation and under illumination, this CCD imager senses each of these pixels by providing a readout signal proportional to the integral of intensity of illumination of this pixel over the duration of illumination of this pixel;
- an objective lens as part of an optical system able to form images of an object field on the active surface of the CCD imager, in order to illuminate the active surface of the CCD imager;
- and driving means able to drive the CCD imager in order to capture successive images formed on the active surface of this CCD imager by the optical system. These driving means comprises at least one image buffer to store pixel values provided by the CCD imager, a shift register to store apodization coefficients (see detail below), and a set of operators: sum, multiplication.

The driving means are adapted to capture successive images according to the following method. An important feature of the invention is notably adding at least an apodization step to the usual digital shutter process. In this specific embodiment, the apodization function that is used is a Hanning function, which presents very little sidelobe effects (the gap over 30 dB is between the main lobe and the first sidelobe). Any other apodization function or window can be used to implement the invention. The instrument function for Hanning apodization can be algebraically written as follows:

$$\text{Hanning}(t) = \begin{cases} \cos^2\left(\frac{\pi t}{T}\right) & \text{if } t \in \left[-\frac{T}{2}; \frac{T}{2}\right] \\ 0 & \text{else} \end{cases} \quad \text{(equation 1)}$$

The algebraical expression for an apodization-enabled shutter process of an incoming video signal x(t) of a given pixel will be expressed as follows:

$$x'_{shut}(t) = \int_{t-T}^{t} x(\tau) \cdot \cos^2\left(\frac{\pi\left(\tau + \frac{T}{2}\right)}{T}\right) d\tau \quad \text{(equation 2)}$$

Figure 11:
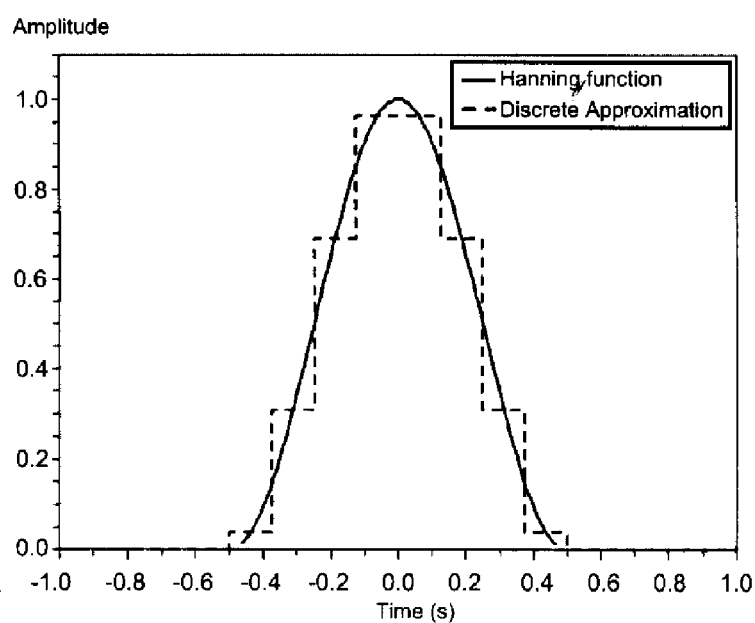
FIG. 11 illustrates the Hanning apodization function used for the main embodiment of the invention with the approximation of this function—apodization coefficient—for each illumination period as used in the main embodiment of the invention.

To implement equation 2, we have to consider the fact that, for each pixel of any successive image, a CCD imager (as a CMOS imager anyway) will only provide portions of the incoming illumination signals that are integrated over the duration of illumination of this pixel. This limitation comes from the usual readout electronics of these imagers. In the current embodiment of this invention, the exposure time of each of the successive images, i.e. the image sensing period, is split into eight equal portions, i.e. eight successive illumination periods. The number of successive illumination periods is generally limited by the imager readout speed and by the noise robustness possibilities. A weighting constant coefficient is extracted to approximate the Hanning function for each of these successive illumination periods, which leads to the following decomposition of the value assigned to each pixel by the driving means:

$$x'_{shut}(t) = \sum_{n=0}^{7} \cos^2\left(\frac{\pi\left(\left(n+\frac{1}{2}\right)\frac{T}{8} + \frac{T}{2}\right)}{T}\right) \cdot \int_{t-(n+1)\frac{T}{8}}^{t-n\frac{T}{8}} x(\tau) d\tau$$

$$= \sum_{n=0}^{7} \underbrace{\cos^2\left(\frac{\pi(2n+9)}{16}\right)}_{\text{term 1}} \cdot \underbrace{\int_{t-(n+1)\frac{T}{8}}^{t-n\frac{T}{8}} x(\tau) d\tau}_{\text{term 2}}$$

where, as illustrated on FIG. 11, term 1 is the approximation of the Hanning function $$\left(\tau = \left(n + \frac{1}{2}\right)\frac{T}{8} \text{ values}\right)$$

for a given illumination period n and term 2 is the value provided by the CCD imager for this pixel, that is the integral of the illumination signal of this pixel over this given illumination period. Therefore, to each pixel, is assigned the sum of the readout signals (term 2) provided by this pixel for each of said successive illumination periods, this sum being weighted by the Hanning apodization function (term 1).

TABLE 1

| n | $\cos^2\left(\frac{\pi(2n+9)}{16}\right)$ | (rational approximation) |
|---|---|---|
| 0 | 0.0380602 | 1/32 |
| 1 | 0.3086583 | 10/32 |
| 2 | 0.6913417 | 22/32 |
| 3 | 0.9619398 | 31/32 |
| 4 | 0.9619398 | 31/32 |
| 5 | 0.6913417 | 22/32 |
| 6 | 0.3086583 | 10/32 |
| 7 | 0.0380602 | 1/32 |

Table 1 shows the values (and a rational approximation) of the approximation of the Hanning function for each illumination period, referenced 0 to 7, to be applied during shutter operation as a time-sequenced gain control.

Each approximation of the Hanning function is then a weighting coefficient, also called an apodization coefficient.

Figure 12:
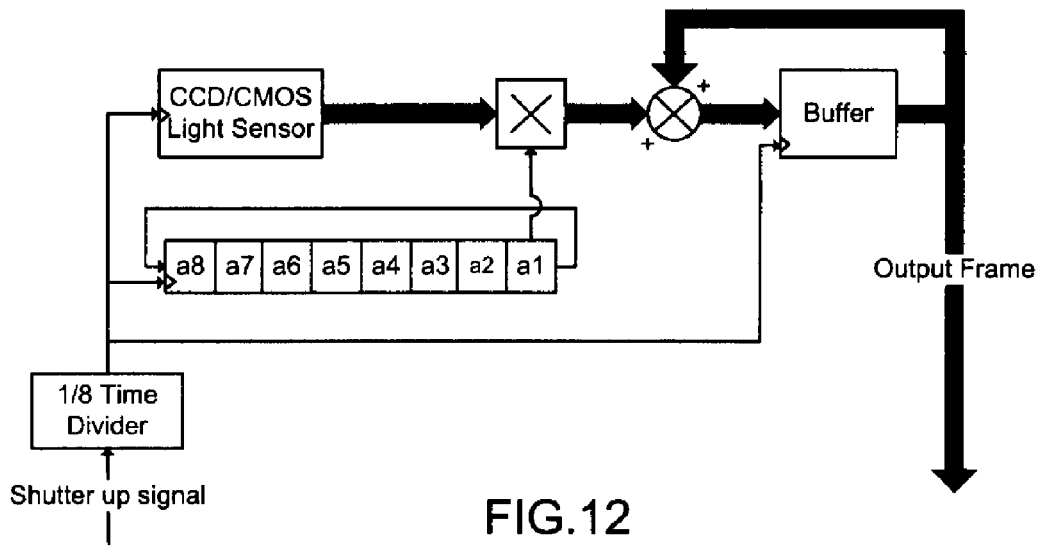
FIG. 12 shows a first implementation of a readout scheme of the video image sensing device that is used in the main embodiment of the invention.

In reference to FIG. 12, a first implementation of a readout scheme of the time-sequenced gain control according to table 1 will now be described. To implement this readout scheme, a new clock signal is defined and equals the shutter up signal uniformly divided by the number of apodization coefficients (8 in our case). Before starting to capture any of the successive images, the image buffer is empty. At each clock cycle, the readout signals provided by the image sensing device are read, then multiplied by the appropriate apodization coefficient, added to the current buffer values in the image buffer, and stored as new values in that same buffer. At the end of the last illumination period corresponding to the end of the image sensing period, the image buffer is readout to obtain the captured image, and the image buffer is cleared for the next image or frame to capture.

The above readout scheme is defined for a readout-with-discharge behavior of the imager, and therefore can apply to both CCD imagers and CMOS imagers.

Figure 13:
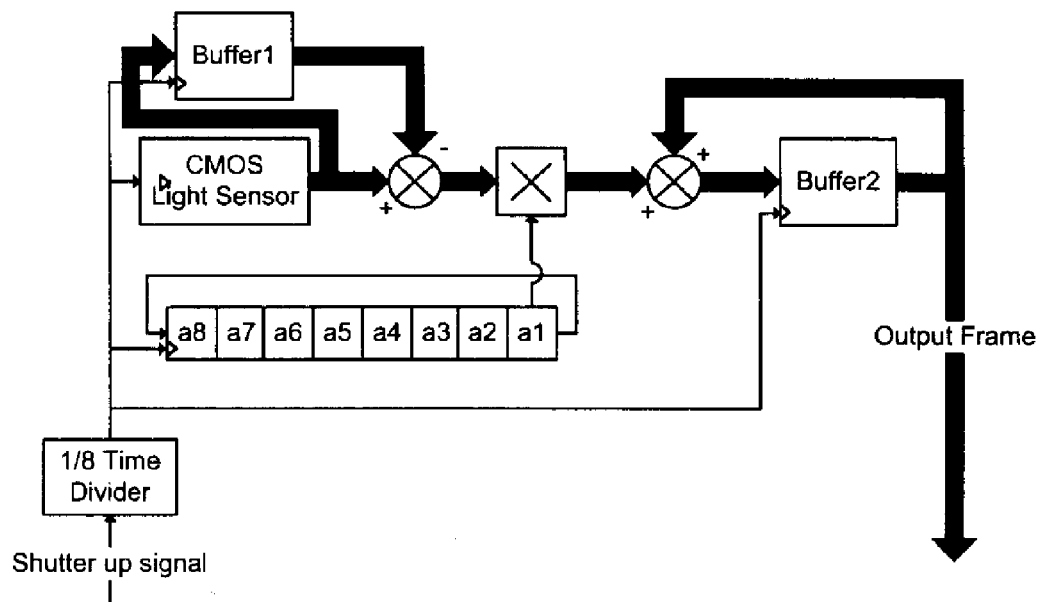
FIG. 13 shows a second implementation of a readout scheme of the video image sensing device that may be used as a variant of the main embodiment of the invention.

In reference to FIG. 13, a second implementation of a readout scheme of the time-sequenced gain control according to table 1 will now be described, which uses two image buffers Buffer1, Buffer2 instead of one. This readout scheme requires only one discharge per shutter cycle frame, thus improving noise robustness but limiting its usability to CMOS imagers only. To implement this readout scheme, a new clock signal is defined and equals the shutter up signal uniformly divided by the number of apodization coefficients (8 in our case). Before starting to capture any image, the image buffers Buffer1 and Buffer2 are empty. At each clock cycle, the readout signals provided by the image sensing device are read, subtracted to the values stored in Buffer1, multiplied by the appropriate apodization coefficient, then added to the current buffer2 values, and stored as new values in that same buffer. In the mean time the pixel values provided by the image sensing device are also stored in Buffer1. At the end of the last illumination period corresponding to the end of the image sensing period, the image buffer2 is readout to obtain the captured image, and the two image buffers are cleared for the next image or frame to capture.

Thank to these specific readout schemes using apodization coefficients, temporal aliasing issues and temporal ringing artifacts are prevented or at least limited in the captured scene comprising the successive images.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Although the illustrative embodiment above have been described herein with reference to the accompanying drawings, it is to be understood that the present principles are not limited to this precise embodiment, and that various changes and modifications may be effected therein by one of ordinary skill in the pertinent art. All such changes and modifications are intended to be included within the scope of the present principles as set forth in the appended claims.

The invention claimed is:

1. A device for video capturing successive images of a scene comprising moving objects, said device comprising an image sensing device having an active surface made of an array of pixels and providing a readout signal representative of a combination of intensity and duration of illumination of each pixel, an optical system able to form successively said images of said scene on said active surface to illuminate said active surface, and a driver able to drive said image sensing device,
wherein, said driver is adapted:
to subdivide an image sensing period of illumination into a plurality of successive illumination periods,
for each of said images, to assign, for each pixel, a sum of the readout signals provided by the respective pixel for each of said successive illumination periods, said sum being weighted by a Hanning apodization function wherein for each illumination period, the value of said Hanning apodization function is based on a time position of said illumination period within said image sensing period of illumination to provide a time sequenced gain control during shutter operation.

2. The device according to claim 1 wherein said image sensing period is inferior to 60 ms.

3. The device according to claim 1 wherein said readout signal is proportional to an integral of intensity of illumination of a pixel over the duration of illumination of this pixel.

4. The device according to claim 1 wherein said driver is also adapted to vary the number of successive illumination periods according to an image sensing period of illumination of said active surface predetermined for said video capture.

5. A method of capturing successive images of a scene comprising moving objects, wherein each image is captured during an image sensing period, said method comprising:
subdividing said image sensing period into a plurality of successive illumination periods;
for each of said successive images, assigning to each pixel of said image a value proportional or equal to a sum of integrals of intensity of illumination of the respective pixel over each of said successive illumination periods, wherein said sum is weighted by a Hanning apodization function wherein, for each illumination period, a value of said Hanning apodization function is based on a time position of said illumination period within said image sensing period to provide a time sequenced gain control during shutter operation.

6. The method according to claim 5, wherein said image sensing period is inferior to 60 ms.

7. The method according to claim 5 further comprising varying a number of successive illumination periods according to a predetermined image sensing period.

* * * * *